(12) United States Patent
Mnich

(10) Patent No.: US 11,273,512 B2
(45) Date of Patent: Mar. 15, 2022

(54) IGNITION DEVICE FOR GTAW WELDING EQUIPMENT

(71) Applicant: ESAB AB, Gothenburg (SE)

(72) Inventor: Andrzej Mnich, Gothenburg (SE)

(73) Assignee: ESAB AB, Gothenburg (SE)

( * ) Notice: Subject to any disclaimer, the term of this patent is extended or adjusted under 35 U.S.C. 154(b) by 519 days.

(21) Appl. No.: 15/630,737

(22) Filed: Jun. 22, 2017

(65) Prior Publication Data

US 2018/0339356 A1 Nov. 29, 2018

Related U.S. Application Data

(60) Provisional application No. 62/510,885, filed on May 25, 2017.

(51) Int. Cl.

| | |
|---|---|
| *B23K 9/067* | (2006.01) |
| *B23K 9/167* | (2006.01) |
| *H02M 11/00* | (2006.01) |
| *H02M 3/335* | (2006.01) |
| *B23K 9/10* | (2006.01) |
| *B23K 37/00* | (2006.01) |
| *B23K 37/02* | (2006.01) |

(52) U.S. Cl.
CPC .......... *B23K 9/0677* (2013.01); *B23K 9/1081* (2013.01); *B23K 9/167* (2013.01); *H02M 3/33507* (2013.01); *H02M 11/00* (2013.01); *B23K 37/006* (2013.01); *B23K 37/0258* (2013.01)

(58) Field of Classification Search
CPC .... B23K 9/0677; B23K 9/1081; B23K 9/167; B23K 37/006; H02M 3/33507; H02M 11/00
See application file for complete search history.

(56) References Cited

U.S. PATENT DOCUMENTS

| 3,108,178 | A | * | 10/1963 | Kelemen | B23K 9/1081 |
| | | | | | 219/98 |
| 3,423,560 | A | * | 1/1969 | Brennen | B23K 9/1081 |
| | | | | | 219/98 |
| 3,651,341 | A | | 3/1972 | Shano | |
| 4,514,795 | A | * | 4/1985 | van der Zwart | H05G 1/10 |
| | | | | | 363/139 |
| 5,592,118 | A | | 1/1997 | Wilmot et al. | |
| 5,770,831 | A | * | 6/1998 | Kaneko | B23H 1/022 |
| | | | | | 219/69.18 |

(Continued)

FOREIGN PATENT DOCUMENTS

CN 1270658 A 10/2000

OTHER PUBLICATIONS

International Search Report and Written Opinion of PCT/IB2018/053202 dated Jul. 24, 2018.

(Continued)

*Primary Examiner* — Erin E McGrath

(74) *Attorney, Agent, or Firm* — Edell, Shapiro & Finnan, LLC

(57) ABSTRACT

An ignition device for welding equipment includes a capacitor, a transformer, a high voltage output circuit connected to a secondary winding of the transformer, a discharging switch enabling discharge of the capacitor to a primary winding of the transformer, a charger and an operation control circuit that controls the charger and the discharging switch.

10 Claims, 2 Drawing Sheets

(56) References Cited

U.S. PATENT DOCUMENTS

| | | | |
|---|---|---|---|
| 5,992,401 A | 11/1999 | Bylsma et al. | |
| 6,304,462 B1 | 10/2001 | Balakrishnan et al. | |
| 7,253,997 B2 * | 8/2007 | Balakrishnan | H02M 1/32 361/18 |
| 2005/0276085 A1 | 12/2005 | Winn | |
| 2007/0103943 A1 * | 5/2007 | Mangtani | H02M 3/33507 363/20 |
| 2007/0215585 A1 * | 9/2007 | O'Connor | B23K 9/1081 219/130.1 |
| 2008/0264915 A1 * | 10/2008 | Manthe | B23K 9/0673 219/130.31 |
| 2011/0085360 A1 | 4/2011 | Balakrishnan et al. | |
| 2015/0076121 A1 | 3/2015 | Krupp et al. | |

OTHER PUBLICATIONS

Notification of first Office Action for Chinese Patent Application No. 201880033809.0 dated Nov. 30, 2020 with English translation, 18 pages.

Communication Pursuant to Article 94(3) from the European Patent Office for European Patent Application No. 18727884.1 dated Apr. 7, 2021, 5 pages.

Off-Line SMPS Current Mode Controller with integrated 500V Startup Cell (Latched and frequency jitter Mode), Nov. 8, 2011, Infineon Technologies AG, 25 pages.

Examination Report No. 1 for Australian Patent Application No. 2018272183 dated Jun. 16, 2020, 4 pages.

\* cited by examiner

IGNITION DEVICE FOR GTAW WELDING EQUIPMENT

CROSS-REFERENCE TO RELATED APPLICATIONS

This application claims the benefit provisional application No. 62/510,885, filed May 25, 2017, the contents of which is incorporated herein by reference in its entirety.

TECHNICAL FIELD

The present embodiment is related to gas tungsten arc welding (GTAW) equipment, and in particular to an arc starting or ignition device.

BACKGROUND

In a welding apparatus, a power supply that supplies an electric arc is a basic part. The power supply, dependently on a method of electric welding, may deliver an electric power of different parameters. An output voltage of any type of the welding power supply is limited to levels defined by the needs of a welding method, safety requirements and a wide understood effectiveness of the apparatus. As a rule, the maximum voltage is far too low to cause an electric breakdown from a working electrode to a workpiece at usual operating distances. Therefore a start of welding may transpire in a contact manner. In this case, the welding starts from a direct contact of a working electrode and the workpiece. After an activation of the power supply, when a certain current flows out of the power supply, the contact is terminated, causing a surge of the voltage and an electric arc between the electrode and the workpiece. Alternatively to the contact method, the welding may begin without the contact of the electrode and the subject. In this alternative case, the welding apparatus comprises an auxiliary device, which for a short time, delivers a voltage high enough to cause electric breakdown between the electrode and the welded subject and further starts the electric arc and the welding process.

BRIEF SUMMARY

In GTAW welding it is expected to start the arc without the contact of an electrode and a workpiece. The ignition device according to the embodiments described herein provides the high voltage needed for the ignition of the electric arc along with high reliability and high safety secured by control of the voltage, the energy and the time of operation.

DESCRIPTION OF EMBODIMENTS

The embodiments described herein employ a capacitor discharge arc ignition device that is suitable for non-contact arc start for GTAW welding.

The principle of the operation of a capacitor discharge arc ignition device is as follows. In a first cycle of operation, a capacitor is charged up to a predetermined voltage level by a charger circuit. Once charged, the capacitor is discharged into a high voltage output circuit comprising the serial connection of the capacitor, a switch and an air or gas gap, between electrodes. In a particular implementation, the serial connection may include a high voltage transformer to obtain the high voltage needed to ionize the atmosphere and create an arc used for welding.

When used in the context of GTAW, and in accordance with the embodiments described herein, the ignition device is configured to provide a reliable non-contact start of the process, and provide an improved level of safety for the operator.

In the present embodiments, and at a high level, the ignition device includes an accumulating capacitor, a charger, a discharging switch and a high frequency, high voltage transformer. The charger periodically charges the capacitor. The capacitor is periodically discharged through a primary winding of the high voltage transformer by means of the discharging switch. The high voltage secondary winding of the transformer then delivers high voltage to a gap between an electrode and the workpiece. Due to inductances and capacitances of the circuit, the discharge process progresses in a resonant fashion. The process is damped according to losses in the gap and losses in all elements of the resonating circuit.

In accordance with the example embodiments, the voltage level to which the capacitor is charged is controlled in three ways, thus providing reliability and safety by keeping the voltage, charge and released energy within acceptable limits.

In an embodiment, the time of a "one-time operation" (i.e., a time of operation within an active external control signal) is limited to a particular value, providing reliability and safety by limiting the energy released within one cycle and disabling permanent generation of the high voltage in the case of failure resulting in the permanent activation of an external control line or start signal.

Figure 1:
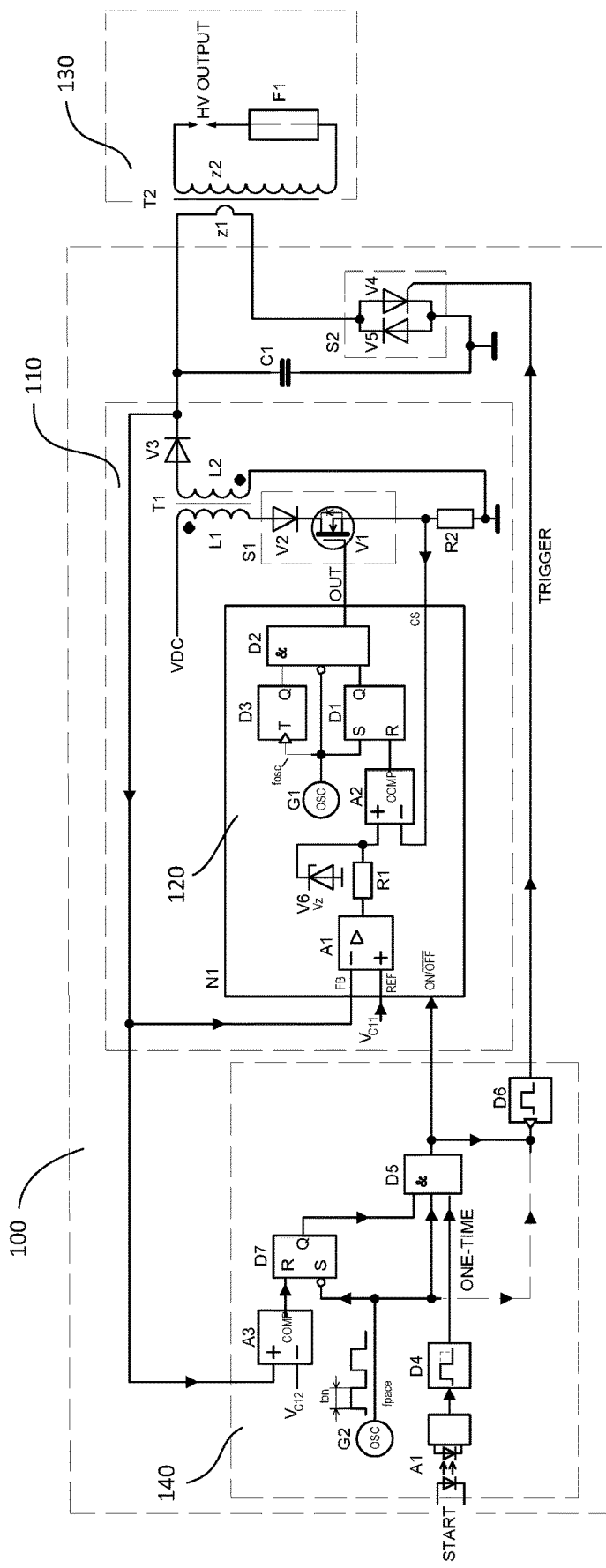
FIG. 1 depicts a functional circuit diagram of an ignition device in accordance with an example embodiment.

FIG. 1 depicts a functional circuit diagram of an ignition device 100 in accordance with an example embodiment. The diagram depicts both functional block and discrete elements.

Figure 2:
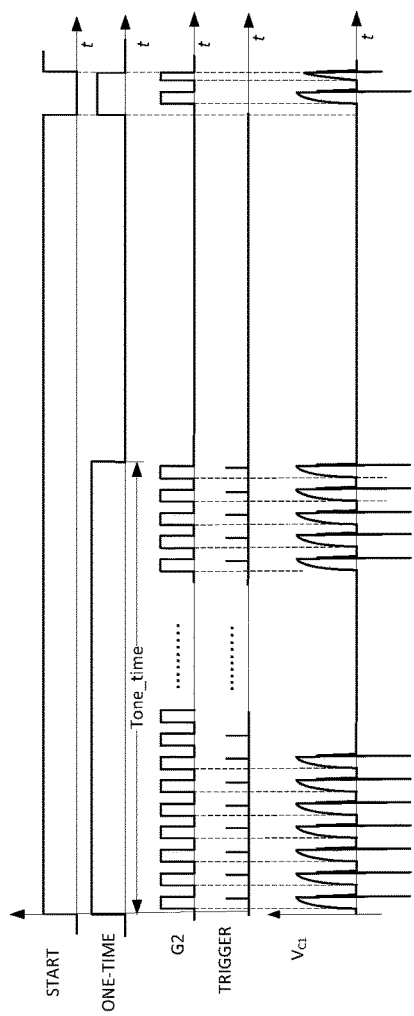
FIG. 2 depicts time diagrams of several signals in the ignition device in accordance with an example embodiment.

FIG. 2 depicts timing diagrams for several signals in the ignition device in accordance with an example embodiment. As will be explained in more detail below, the diagram shows, among other things, that an unintentional unlimited start signal (START) is internally limited to a predefined limit (ONE-TIME signal). The next operation may be started after removal of the start signal and consequent start activation. The low frequency or pace oscillator G2 in a particular embodiment stops the operation. However in another embodiment, the oscillator G2 may continue its operation, while the charging of the capacitor is disabled in another way. Trigger pulses (TRIGGER) fire the discharging switch are also shown. The last time diagram shows the voltage on the capacitor ($V_{C1}$) during the cycle of the operation.

Figure 3:
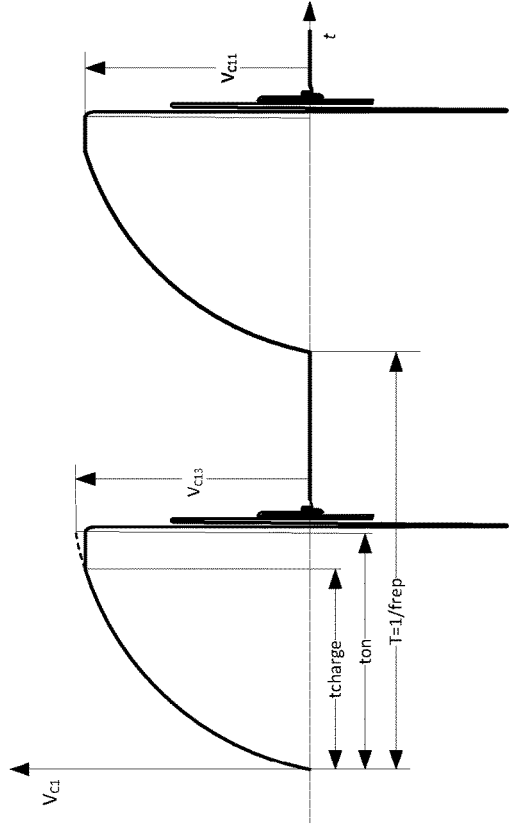
FIG. 3 depicts time diagrams of the voltage on a charging capacitor with an increased time scale in accordance with an example embodiment.

FIG. 3 depicts the time diagrams of the voltage on the charging capacitor with an increased time scale, to more clearly illustrate the charge and discharge process and to show the voltage levels $V_{C11}$ and $V_{C13}$. The voltage level $V_{C12}$ is not shown in the figure. $V_{C12}$ is expected to be greater than $V_{C11}$, and lower than $V_{C13}$, however these are not obligatory conditions.

Referring to FIG. 1, in the ignition device 100, the charger 110, which is configured as a flyback converter, charges capacitor C1. The charger 110 comprises coupled inductor T1 with primary winding of inductance L1 and secondary winding of inductance L2, a switch S1 having a reverse blocking capacity, presented as a serial connection of a MOSFET transistor V1 and diode V2, secondary rectifier V3 and a pulse width modulation (PWM) control circuit N1 120 operating on the principle of the peak current mode (PCM).

PMW control circuit N1 120 may be an integrated control circuit and comprises oscillator G1, producing short pulses of high frequency $f_{osc}$, voltage feedback amplifier A1, and a maximum current limiter in the form of resistor R1 and Zener diode V6. PMW control circuit N1 120 further comprises peak current comparator A2, PWM latch D1, and output logic element (AND gate) D2. PMW control circuit N1 120 may still further include a T-trigger D3, which divides the frequency of the operation ($f_{osc}$) by, e.g., two and thus limits the maximum duty cycle to 50%. PMW control circuit N1 120 includes a control input ON/OFF, which starts and stops the operation. Although not shown in the figure, the operation may be stopped by, e.g., stopping oscillator G1, among other approaches, such that MOSFET V1 is precluded from being turned on, and such that current does not flow through the primary winding of T1.

The charger is supplied from an external direct current low voltage supply VDC.

The ignition device 100 of the present embodiments further includes an operation control circuit 140 comprising low frequency oscillator G2, having a predefined frequency and generating pulses of predefined width ton (see FIGS. 2 and 3).

The signal from the low frequency oscillator G2 is applied to AND logic gate D5 enabling the operation of the charger 110 only during the active pulse within the ton time through the control input ON/OFF. Thus, the charger 110 operates during the ton time. On the down slope of the ton pulse, the trigger pulse is generated by the monoflop D6. A switch S2 of the reverse conductivity, presented as a thyristor V4 with a diode V5 is thus activated closing the circuit of serial connection of the primary winding z1 of the high voltage transformer T2, and the capacitor C1. Reverse conductivity through V5 is required due to the resonant character of the discharge. The output winding z2 of the transformer T2 is connected to the gas gap, i.e., the high voltage output (HV OUTPUT) of high voltage output circuit 130. The high voltage output circuit 130 may include a clamping circuit F1. Once switch S2 (thyristor V4) is activated, the high voltage appears at the gas gap, ionizing the space between the electrodes, thus creating the conductive path to enable a low voltage GTWA arc. The GTWA welding power supply interconnection to the ignition device 100 is not depicted in FIG. 1 as it is not relevant to the present embodiments.

The charger 110 and PMW control circuit 120 work on the principle of a flyback converter in discontinuous current mode operation (DCM). Every pulse from the oscillator G1 sets the PWM latch D1. On the downslope of the pulse from oscillator, the control output OUT activates the switch S1 by applying an appropriate voltage to the gate of V1. Thus, the current in the primary winding L1 increases starting from the zero. The current is sensed using resistor R2 and a current sense signal CS is delivered to the PWM control circuit comparator A2. Once the current reaches the value equal to the voltage on the +input of the comparator A2 divided by the resistance R2, the PWM control circuit latch D1 is reset, switching off the output signal OUT. The voltage on windings L1, L2 reverses and the current in the coupled inductor T1 starts to flow through the diode V5 charging the capacitor C1. The cycle is repeated on every pulse of G1 oscillator.

Initially, the current in the winding L1 increases to the certain maximum value, defined by the reference voltage Vz from the V6 reference diode, and the resistance of R2. When the voltage of the capacitor C1 reaches the $V_{C11}$ level (FIG. 2) the voltage feedback amplifier A1 starts to decrease the current reference. Thus, the voltage feedback loop is closed and the charger keeps the voltage on the capacitor C1 at the level $V_{C11}$. In this way the voltage on the capacitor is regulated in a first way.

Due to importance of the $V_{C1}$ voltage level, second, separate, overvoltage protection is implemented. Specifically, the comparator A3 resets the trigger D7 once voltage $V_{C12}$ is reached. The trigger D7 is reset on every absence of the pulse from pace oscillator G2. Thus the voltage on capacitor C1 cannot be greater than $V_{C12}$, even under a scenario in which the voltage feedback loop comprising voltage feedback amplifier A1 does not work.

The maximum voltage on the capacitor C1 is limited in a third way to a level $V_{C13}$. Since the peak current in the primary winding L1 of the coupled inductor T1 is limited to the value Vz/R2, and the charging time is limited to the ton, the maximum voltage on the capacitor C1 is limited to the value:

$$V_{C13} = \frac{V_z}{R_2} * \sqrt{\frac{L_1}{C_1} * t_{on} * f_{osc}}$$

If the PWM control circuit N1 120 includes T-trigger D3, then $$V_{C13} = \frac{V_z}{R_2} * \sqrt{\frac{L_1}{C_1} * t_{on} * \frac{f_{osc}}{2}}$$

Thus, in accordance with the embodiments described herein there is provided an ignition device that includes a charger, a pulse width modulation control circuit that is configured to control charging of a capacitor of the charger, a high voltage output circuit electrically connected to the capacitor and comprising a switch that enables the capacitor to be discharged, and an operation control circuit that controls the switch to cause a high voltage to be present at an output of the high voltage output circuit The embodiments described herein provide several distinctive features, including a charger employing a flyback converter with a switch having a reverse blocking capacity, triple control over the charging voltage, and a limited ignition operation time.

More specifically, the accumulating capacitor C1 is charged from the flyback converter with switch S1 having a reverse blocking capacity as a result of diode V2. Diode V2 protects the converter and the voltage supply VDC against reverse voltage, which appears during the resonance of the accumulating capacitor C1 and the external inductances and capacitances.

The maximum voltage on the accumulating capacitor C1 is limited in three ways. First, the flyback converter has accurately defined momentary power and accurately defined time of the operation. The capacitor has accurate capacitance. In this way, the portion of energy and consequently the maximum capacitor's voltage is well defined. Second, the flyback converter comprises a voltage feedback loop via A1, thus the capacitor's voltage is well defined. Third, a backup voltage feedback loop via A3 with latch D7 disables the operation of the flyback converter when the capacitor's voltage is too high.

Finally, the one-time operation of the unit is internally limited. On presence of the START signal on the input of the timer D4, its output (ONE-TIME signal) is activated, but only for time not longer than a predefined or predetermined time. Further, the output of the timer D4 is not active in absence of the START signal. The ONE-TIME signal enables the operation of the unit by means of the gate D5. In this way the equipment is protected against a general failure wherein the unit is driven by an inadvertently applied permanent START signal. In addition, due to this time limit, total energy and total charge delivered by the unit within one cycle of welding are limited.

The above description is intended by way of example only. Various modifications and structural changes may be made therein without departing from the scope of the concepts described herein and within the scope and range of equivalents of the claims.

What is claimed is:

1. An ignition device for welding equipment, comprising:
   a capacitor;
   a transformer having a primary winding connected to the capacitor;
   a high voltage output circuit comprising a secondary winding of the transformer;
   a switch that enables the capacitor to be discharged through the primary winding of the transformer;
   a charger comprising a pulse width modulation control circuit configured to control charging of the capacitor, the charger comprising a second transformer, a latch and an AND gate, wherein the latch is set by an oscillator signal and reset by a signal indicative of current flowing through a primary coil of the second transformer, wherein an output of the latch and the oscillator signal are supplied to the AND gate, and wherein an output of the AND gate controls a second switch that controls the current flowing through the primary coil of the second transformer; and
   an operation control circuit, including at least a second latch, that controls the charger to cause periodical charging of the capacitor and further controls the switch to cause periodical discharging of the capacitor and consequently a high voltage to be present at an output of the high voltage output circuit,
   wherein the charger and the operation control circuit receive a feedback signal representative of a voltage present across the capacitor,
   wherein the second latch is at least partially responsive to the feedback signal, and
   wherein the operation control circuit inhibits the periodical charging of the capacitor by the charger in response to the feedback signal being at a predetermined level.

2. The ignition device of claim 1, wherein the charger is configured to supply limited momentary power and is activated by the operation control circuit for a predetermined amount of time.

3. The ignition device of claim 1, wherein the charger comprises a flyback converter with the second switch having a reverse blocking capacity that prevents a reverse voltage from being applied to a voltage supply that supplies voltage to the charger.

4. The ignition device of claim 1, wherein the signal indicative of current flowing through a primary coil of the second transformer controls a maximum voltage to which the capacitor can be charged.

5. The ignition device of claim 1, wherein the operation control circuit comprises a voltage sensor, and the operation control system is configured to stop charging the capacitor when a voltage sensed by the voltage sensor exceeds a predefined voltage level.

6. The ignition device of claim 1, wherein the switch has reverse conductivity and the switch is controlled by a trigger signal generated by the operation control circuit to cause the periodical discharge of the capacitor.

7. The ignition device of claim 1, wherein the operation control circuit includes a pace oscillator, and the charger is allowed to operate only in a presence of a signal from the pace oscillator.

8. The ignition device of claim 7, wherein a trigger signal that is applied to the switch is generated by a logical combination of a signal from the pace oscillator and a one-time signal, or directly by the signal of the pace oscillator.

9. The ignition device of claim 1, wherein the operation control circuit is configured to stop an operation of the charger when an external command signal remains active longer than a predefined time.

10. The ignition device of claim 1, further comprising a component that receives the oscillator signal and outputs a signal to the AND gate to modify a duty cycle of operation of the second switch.

* * * * *